United States Patent [19]

Gillett et al.

[11] Patent Number: 4,747,009

[45] Date of Patent: May 24, 1988

[54] AIR CONDITIONER CLUTCH CONTROL DEVICE

[75] Inventors: Jimmie D. Gillett, Garland; Richard R. Garcia, Plano, both of Tex.

[73] Assignee: Ranco Electronics Division, Irving, Tex.

[21] Appl. No.: 849,151

[22] Filed: Apr. 7, 1986

Related U.S. Application Data

[63] Continuation-in-part of Ser. No. 601,270, Apr. 17, 1984, abandoned.

[51] Int. Cl.$^4$ .............................................. H01H 47/26
[52] U.S. Cl. ................................................... 361/165
[58] Field of Search ................ 361/165, 194; 307/117, 307/130; 323/369; 219/491, 494, 505

[56] References Cited

U.S. PATENT DOCUMENTS

4,254,906  3/1981  Hayes ................................. 307/117
4,630,165  12/1986  D'Onofrio ........................... 361/194

FOREIGN PATENT DOCUMENTS

1673479  7/1971  Fed. Rep. of Germany.
2466804  10/1980  France.

OTHER PUBLICATIONS

G. R. Lewis, Low-cost Temperature Controller Built with Timer Circuit, Aug. 16, 1975, Electronic Design, 17.

Elektor, vol. 9, No. 7/8, Jul./Aug. 1983, pp. 7-66, 7-67, Canterbury, Kent, Great Britain, "Interior Temperature Control for Cars".

Electrical Design, vol. 30, No. 16, Aug. 1982, pp. 217, Denville, N.J., U.S.A., R. S. Rohella, "Dual-Time Chip Control Temperature While Monitoring Liquid Level".

Primary Examiner—L. T. Hix
Assistant Examiner—David M. Gray
Attorney, Agent, or Firm—Watts, Hoffmann, Fisher & Heinke

[57] ABSTRACT

An air conditioner clutch control device includes a resistive type temperature sensor, connected to power dividers for providing a threshold voltage and a trigger voltage for first and second comparators. Resistor type power dividers provide first and second reference voltages to the comparators. Logic circuits are attached to the comparators for providing first and second state signals. Thus, when the temperature exceeds the first reference the first state is produced to turn on the air conditioner; when the temperature falls below the second reference, the second state is produced to turn off the air conditioner. A zener diode is provided to protect the logic circuits from transients in the battery source of power and from a reversal in polarity. A coil of a relay switch is operated by the first and second states to close a switch to energize a coil of a relay switch of an air conditioner's compressor. The coil of the relay switch protects the logic circuits from self-induced transients and a diode protects the logic circuits from excess positive voltage. The coil of the relay switch of the air conditioner is, for positive switching, connected permanently to ground and the positive end is switched and for negative switching, connected permanently to the battery source of power and the negative end is switched.

13 Claims, 2 Drawing Sheets

AIR CONDITIONER CLUTCH CONTROL DEVICE

The present application is a continuation-in-part of application Ser. No. 601,270, filed Apr. 17, 1984 entitled "Temperature Sensing Circuit" to Gillett, now abandoned.

BACKGROUND OF THE INVENTION

This invention relates to air conditioners and more particularly to a clutch control for automobile type air conditioners.

In the past, automobile type air conditioner clutch controls have included mechanical devices that open and close circuits when the temperature deviates from a preset value or range of values to actuate the controls of an air conditioner to produce the required corrective action.

More recently, a temperature sensing circuit has been provided that includes a device that makes use of the change in resistivity of a semiconductor with change in temperature, such as, for example, a thermistor. A thermistor has a high negative temperature coefficient of resistance, so its resistance decreases as temperature rises. The thermistor has an external resistor network to which a detection circuit is connected to provide an output of a first state when the detected resistive value increases beyond a first point and an output of a second state when the detected resistive value decreases beyond a second point.

The detection circuit includes two comparators, a latch, and an internal resistive network; these elements are included in a commercially available timer, manufactured by Intersil Corporation and sold under the designation ICM7555. The comparators are connected to the external resistive circuit and to the internal resistive network. The comparator compares the resistance changes of the external resistance network with the control internal resistance network and sets the latch in the first state when the element resistance increases beyond a first transition point and in the second state when the element resistance decreases beyond a second transition point. The transition points are the result of hystersis of the external resistance circuit and thermistor. Those persons skilled in the art desiring a more detailed description of the thermistor controlled circuit are referred to U.S. Patent application, Ser. No. 601,270; filed: Apr. 17, 1984 for a "Temperature Sensing Circuit" (B4864).

The problem with the thermistor sensing circuit is that of transient motion. That is, high voltage pulses appear on the battery voltage to produce an irregular motion between the first and second states. Another problem relates to self-induced transients within the circuit. These transients destroy the credibility of the first and second states and if severe enough, the integrated circuits of which the device is made.

Another problem, attending the use of the thermistor sensing circuit in automobile air conditioner clutches, involves polarity. While some air conditioner clutches are designed for positive polarity (switching), others are designed for negative polarity (switching).

SUMMARY OF THE INVENTION

Accordingly, it is an object of the present invention to provide an improved air conditioner clutch control device.

Another object of the invention is to provide an air conditioner clutch control circuit including a transient control subcircuit.

A further object of the invention is to provide a clutch control circuit for a positive polarized air conditioner circuit.

Still another object of the invention is to provide a clutch control circuit for a negative polarized air conditioner circuit.

Yet, another object of the invention is to provide a clutch control circuit which is low in cost, reliable, and easy to install and maintain.

Briefly stated, the air conditioner clutch control constituting the subject matter of this invention includes in a first embodiment a temperature sensing circuit and protection circuits for protecting the temperature sensing circuit from power supply and self-induced transient voltages and a second embodiment further including a polarity determining means for adapting the air conditioner clutch control to the polarity of the air conditioner control circuit.

BRIEF DESCRIPTION OF THE DRAWINGS

Other objects and features of the invention will become more readily understood from the following detailed description and appended claims when read in conjunction with the accompanying drawings in which:

DESCRIPTION OF THE PREFERRED EMBODIMENTS

Figure 1:
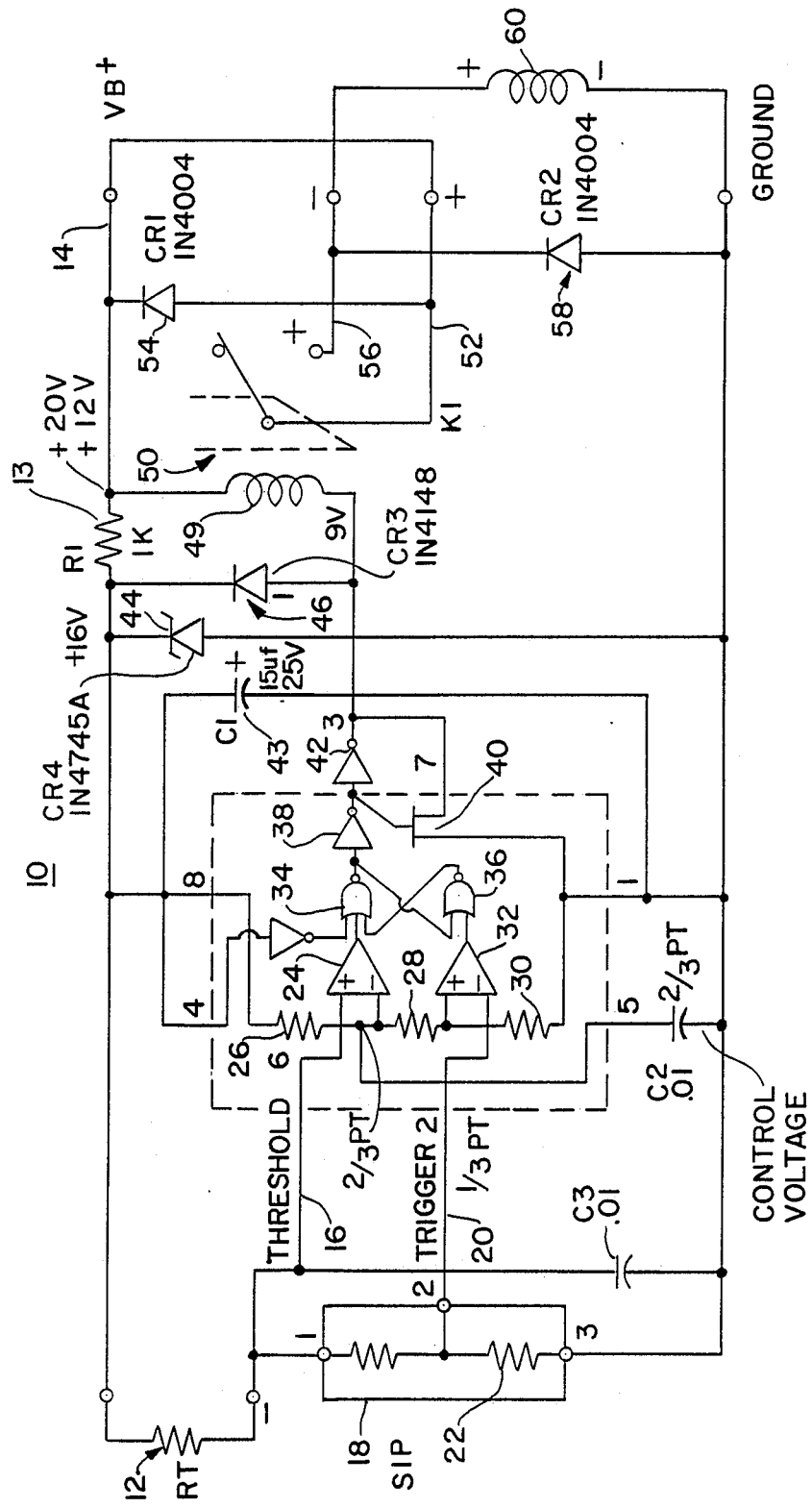
FIG. 1 is a schematic view of the air conditioner clutch control circuit with positive polarity.

Referring now to FIG. 1, the air conditioner clutch control circuit 10 with positive polarity (switching) includes resistive temperature device 12 such as, for example, a thermistor having one end connected through a voltage dropping resistor 13 to a source of power 14; a second end of the thermistor 12 is connected to the junction of a threshold lead 16 and one end of a resistor 18 to form a first power divider. The resistor 18 has a second end connected to the junction of a trigger lead 20 and one end of resistor 22 to form a second power divider. The resistor 22 has a second end connected to ground. The thermistor 12 and resistors 18 and 22 form a first or external resistive network, i.e. external to the resistor network of an ICM555 timer circuit manufactured by Intersil Inc., hereinafter referred to as the second or internal resistor network.

The threshold lead 16 is connected to the positive terminal of a comparator 24. The comparator 24 has its negative terminal connected to a $\frac{2}{3}v+$ point in the internal resistor circuit. The internal resistor network includes resistors 26, 28, and 30 connected in series between the sources of power 14 and ground. The $\frac{2}{3}v+$ point is between resistors 26 and 28 and a $\frac{1}{3}v+$ point is between resistors 28 and 30.

The trigger lead 20 is connected to the negative terminal of a comparator 32. The positive terminal of comparator 32 is connected to the $\frac{1}{3}v+$ point of the internal resistor network.

A flipflop has first and second NOR gates 34 and 36 having input terminals connected, respectively, to the outputs of comparators 24 and 32. NOR gate 34 is also connected to the reset terminal and to the output of NOR gate 36. While the output of NOR gate 36 is connected to the output of NOR gate 34. An inverter 38 inverts the output of NOR gate 34. The inverter 38 has its output connected to the junction of field effect transistor (FET) 40 and inverter 42. The FET 40 is connected to output pin 7 which is connected to pin 3. Inverter 42 is connected to output pin 3.

Thus, when the threshold voltage is greater than $\frac{2}{3}(v^+)$ and the trigger voltage valve is greater than $\frac{1}{3}(v^+)$ with reset high, the output is low and the discharge pin 7 is ON to assist output pin 3 pull the voltage low.

When the trigger valve falls below $\frac{1}{3}(v^+)$ with reset high, the output is high and the discharge pin 7 is OFF. The output is stable between $\frac{1}{3}$ and $\frac{2}{3}$ threshold voltage. A capacitor 43 connects the source of power at the reset and power input pins 4 and 8 to ground to remove any spurious frequencies in the battery power supply to ground and stabilize the dc applied to the 555 timer.

A zener diode 44 connects the source of power to ground across the 555 timer for protecting the IC 555 timer. Thus, at voltages up to +16 v, for example, the zener diode acts as a rectifier, but above the +16 v the zener diode conducts with the voltage drop across the diode remaining essentially constant independent of current for voltage regulating or limiting, i.e. clamping the voltage at, for example +16 v. If for some reason the polarity is reversed, the zener diode clamps at, for example, about −1 v for protecting the IC 555 timer. The zener diode also bypasses any battery voltage transients to ground to protect the IC 555 timer. Thus, the zener diode connected as described forms a power supply transient protection subcircuit.

A diode 46 has its cathode connected to one end of the voltage dropping resistor 13. The other end of the resistor 13 is connected to the junction of the source of power 14 and to one end of the coil 49 of a relay switch 50. The other end of the relay switch coil 49 is connected to the junction of the anode of the diode 46 and to the output pin 3. The purpose of diode 46 is to shunt the inductive energy of the coil away from the 555 timer to limit the positive voltage at the 555 timer's output terminal 42 (pin 3). In the arrangement, the coil 49 connected as described above also acts as a filter to attenuate any self-induced transients. Thus, a self-induced transient subcircuit is provided.

The relay switch 50, has its pole connected by lead 52 to the junction of the anode of a diode 54 and to the battery voltage. The cathode of the diode 54 is connected to the source of power 14. The diode 54 is a power leakage diode to protect the contacts of the relay switch during positive switching of the air conditioner clutch.

One contact of the relay switch 50 is connected to ground for providing an open circuit. The second contact is connected by lead 56 to the junction of the cathode of a diode 58 and a coil 60 of a compressor relay switch. The anode of diode 58 and the other end of coil 60 are connected to ground. The diode 58 is used to protect the relay switch contacts during negative switching, hereinafter described. With the coil permanently connected to ground the positive side is switched; this is called positive switching or positive polarity.

Figure 2:
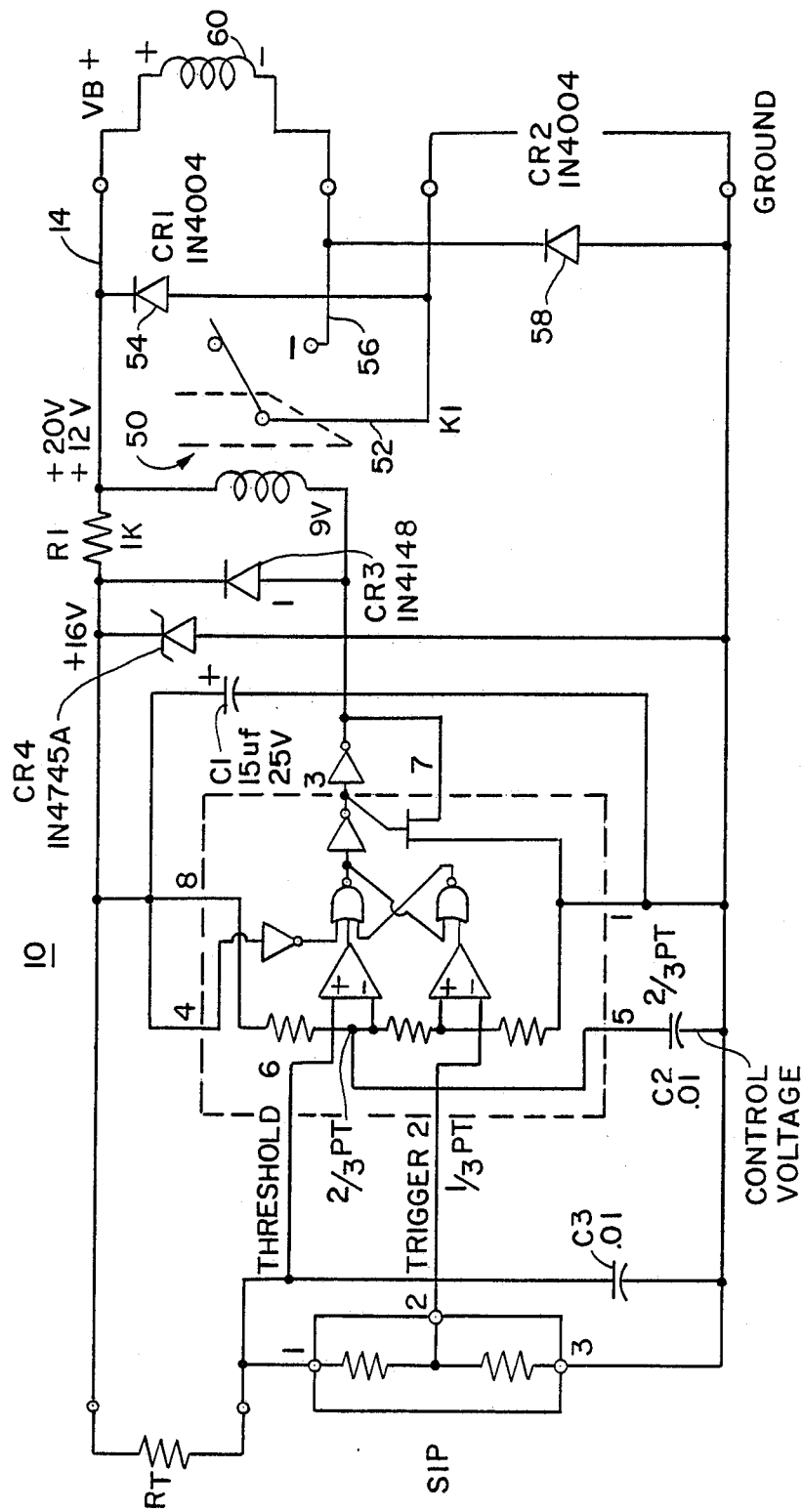
FIG. 2 is a schematic view of the air conditioner clutch control circuit with negative polarity.

Referring now to FIG. 2, the air conditioner clutch control circuit 10 with negative polarity is identical to that of FIG. 1 with the exception that the pole of switch 50 is connected by lead 52 to ground. While, the second contact of relay switch 50 is connected by lead 56 to one end of relay coil 60; the second end of relay coil 60 is connected to the source of battery voltage 14. Thus, with the coil connected permanently to the battery power source, the negative side of the coil is switching. This is referred to as negative switching or negative polarity.

In operation, when the thermistor 12 (FIG. 1) of the air conditioner clutch control circuit 10 senses a temperature rise above a first temperature point, the external resistive circuit outputs a voltage on lead 16 to the voltage comparator 24 that exceed the $\frac{2}{3}v^+$ reference point of the internal resistive circuit connected to the comparator's negative terminal. Simultaneously, lead 20 connected between resistors 18 and 22 of the external resistive circuit applies a voltage to the negative terminal of comparator 32 which is greater than the $\frac{1}{3}v^+$ of the internal resistor circuit connected to the positive terminal of comparator 32. The result is that the output of the 555 timer goes low. Also, with the discharge terminal pin 7 connected to pin 3, the discharge circuit assists in establishing the low voltage ouptut.

With a low voltage applied to the coil 49, power flows through the coil of relay switch 50 with a positive polarity to close the switch. With the switch closed power flows from the battery through lead 52 which is positive to the relay switch 50, and from the switch through lead 56 to the positive and negative ends of coil 60 of the compressor clutch control relay switch to ground.

With coil 60 of the air conditioner compressor clutch control relay switch energized, the relay switch closes to turn on the compressor to begin the cooling operation of the air conditioner.

The cooling operation continues until the second temperature transition point is reached. At this point, the thermistor's external resistive voltage on lead 20 connected to the negative terminal of comparator 32 is less than the internal resistor's network $\frac{1}{3}v^+$ applied to the positive terminal; this triggers the output of the 555 timer high. At this point, the discharge circuit is triggered off.

With a high voltage applied to coil 49, the polarity coil 50 is reversed and the relay switch opens to turn off the compressor of the air conditioner.

In the second embodiment (FIG. 2), the coil 60 of the air conditioner's relay switch is connected to the battery voltage above the control relay switch to make the lead terminal 56 of the relay switch negative.

The zener diode 44 (FIG. 1) connected as described acts as a bypass circuit for any battery voltage transients and for reverse polarity. The zener diode clamps at, for example, plus 16 volts thereby providing low power voltage power control and IC protection to the 555 timer and in the case of reverse polarity the zener clamps at, for example, minus one volt for timer protection. Further, the coil 50 of the relay switch acts as a spike filter for attenuating short duration self-induced transients whose amplitude exceeds considerably the average amplitude of the associated pulse or signal. While the diode 46 leaks excessive positive voltages away from the timer output terminal.

Although several embodiments of this invention have been described, it will be apparent to a person skilled in the art that various modifications to the details of construction shown and described may be made without departing from the scope of this invention.

What is claimed is:

1. An air conditioner clutch control device for an automobile or the like comprising:

(a) a resistive circuit having a terminal for connection to a source of power, said circuit including a variable resistance means whose resistance is responsive to temperature changes, said variable resistance means having a first terminal for connection to a power source and a second terminal, and a power divider means connected to the second terminal of said variable resistance means, said power divider means having first and second power dividers having first and second outputs for outputting signals indicative of a range of temperatures including first and second temperature indicating transition points;

(b) first and second state signal producing means including first and second power dividers connected for connection to the power source for producing first and second reference voltages corresponding to the first and second temperature transition points; first and second comparator means connected to receive, respectively, the voltage output of the first power divider of the variable resistance means and the first reference voltage, and the voltage output of the second power divider of the variable resistance means and the second reference voltage for producing first and second difference signals indicative of the first and second temperature transition points; logic signal producing means connected to receive the first and second difference signals for producing a first state signal when the voltage output of the first divider of the variable resistance means exceeds the first reference voltage and a second state signal when the voltage output of the second divider of the variable resistance of means falls below the second reference voltage; and a power switching means connected to receive the logic first and second state signals for switching power from a source of power on and off;

(c) a low voltage control means connected across the first and second state signal producing means for protecting said first and second state signal producing means from power supply transients and reversed polarity signals;

(d) an inductive switching means and a diode, said inductive switching means for connection to the source of power and a junction of the diode and the power switching means of the first and second state signal producing means, said diode for shunting the inductive energy of the inductive switching means in part away from the first and second state signal producing means during power switching and said inductive switching means coacting with the diode for attenuating any self-induced transients; said inductive switching means responsive to the on/off state of the power switching means for outputting air conditioner compressor clutch control signals; and (e) an air conditioner compressor clutch control relay switch means responsive to the control signals of the inductive switching means for selectively turning the air conditioner on at the first temperature transition point for cooling down to the second temperature transition point and off at the second transition point until the temperature rises to the first transition point.

2. An air conditioner clutch control device according to claim 1 wherein the variable resistance means of the resistive circuit is a thermistor.

3. An air conditioner clutch control device according to claim 1 wherein the first and second power dividers of the resistive circuit includes a pair of resistors connected in series between the variable resistance means and ground.

4. An air conditioner clutch control device according to claim 1 wherein first and second state signal producing means power dividers includes a plurality of resistors serially connected between the power source and ground.

5. An air conditioner clutch control device according to claim 1 wherein the first and second comparator means of the first and second state signal producing means includes difference amplifiers.

6. An air conditioner clutch control device according to claim 1 wherein the logic signal producing means of the first and second state signal producing means includes a flipflop.

7. An air conditioner clutch control device according to claim 1 wherein the low voltage control means includes a zener diode.

8. An air conditioner clutch control device according to claim 1 wherein the inductive switching means includes a coil operated switch.

9. An air conditioner clutch control device according to claim 1 wherein the air conditioner compressor clutch control relay switch includes a coil having one end permanently connected to ground for positive switching responsive to the operation of the inductive switching means.

10. An air conditioner clutch control device according to claim 1 wherein the air conditioner compressor clutch control relay switch means includes a coil having one end permanently connected to the source of power for negative switching responsive to the operation of the inductive switching means.

11. An air conditioner clutch control device according to claim 1 wherein the air conditioner clutch control relay switch means includes a diode selectively connected between the inductive switching means and selectively to the power source and ground for protecting the contacts of the inductive switching means from arcing.

12. An air conditioner clutch control device comprising:
(a) a temperature sensing circuit means for generating analog signals representative of a range of temperatures including first and second temperature set point temperatures for a space to be cooled;
(b) a first and second temperature set point signal generator means connected to the sensing circuit means for generating signals indicative of temperatures above and below the first and second set point temperatures;
(c) logic means connected to the first and second set point signal generator means for producing high and low state signals, respectively, in response to the first and second set point temperature indicating signals;
(d) a power switching means connected to the logic means for turning on and off in response to the high and low state signals; and
(e) a relay switching means connected between the power means and a power source connection terminal for selectively receiving power in response to the state of the power switching means, said relay switching means including means for connection to an air conditioner clutch whereby the air conditioner turns on at a first selected temperature and remains on until the temperature falls below a second selected temperature and turns off at the second temperature until the temperature rises above the first temperature.

13. An air conditioner clutch control device according to claim 12 wherein the relay switching means includes a coil for connection to a source of power having a voltage sufficient for coil switching and further includes a diode connected across the coil to bleed away a preselected amount of the coil's positive voltage from the power switching means.

* * * * *